United States Patent
Anderson et al.

(10) Patent No.: US 11,195,120 B2
(45) Date of Patent: Dec. 7, 2021

(54) DETECTING DATASET POISONING ATTACKS INDEPENDENT OF A LEARNING ALGORITHM

(71) Applicant: Cisco Technology, Inc., San Jose, CA (US)

(72) Inventors: Blake Harrell Anderson, Chapel Hill, NC (US); David McGrew, Poolesville, MD (US); Subharthi Paul, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 912 days.

(21) Appl. No.: 15/892,475

(22) Filed: Feb. 9, 2018

(65) Prior Publication Data
US 2019/0251479 A1   Aug. 15, 2019

(51) Int. Cl.
*G06N 20/00* (2019.01)
*H04L 29/06* (2006.01)

(52) U.S. Cl.
CPC ......... *G06N 20/00* (2019.01); *H04L 63/1425* (2013.01); *H04L 63/1441* (2013.01)

(58) Field of Classification Search
CPC . G06N 20/00; H04L 63/1441; H04L 63/1425; H04L 63/1466
See application file for complete search history.

(56) References Cited

U.S. PATENT DOCUMENTS

| | | | |
|---|---|---|---|
| 9,690,938 B1* | 6/2017 | Saxe | G06N 3/04 |
| 9,762,611 B2 | 9/2017 | Wallace et al. | |
| 2014/0041032 A1* | 2/2014 | Scheper | H04L 63/1425 726/23 |
| 2016/0057159 A1 | 2/2016 | Yin et al. | |
| 2016/0078365 A1 | 3/2016 | Baumard | |
| 2017/0279830 A1 | 9/2017 | Mermoud et al. | |
| 2018/0005136 A1* | 1/2018 | Gai | G06N 20/00 |

OTHER PUBLICATIONS

P. McDaniel, N. Papernotand Z. B. Celik, "Machine Learning in Adversarial Settings," in IEEE Security & Privacy, vol. 14, No. 3, pp. 68-72, May-Jun. 2016, doi: 10.1109/MSP.2016.51. (Year: 2016).*
J. Jin, et al., "Robust Convolutional Neural Networks Under Adversarial Noise," arXiv preprint arXiv:1511.06306 2015, Workshop track—ICLR 2016, Feb. 25, 2016, 8 pgs.
J. Goodfellow et al., "Explaining and Harnessing Adversarial Examples," arXiv preprint arXiv:1412.6572, 2014, Published as a conference paper at ICLR 2015, Mar. 20, 2015, 11 pgs.

(Continued)

*Primary Examiner* — Kakali Chaki
*Assistant Examiner* — Michael H Hoang
(74) *Attorney, Agent, or Firm* — Edell, Shapiro & Finnan, LLC

(57) ABSTRACT

Methods an systems to classify a training dataset of network data as a poisoned training dataset based on a first dataset-level classifier, identify and remove poison samples of the poisoned training dataset based on a sample-level classifier to produce a non-poisoned dataset, training a machine-based model to analyze network traffic based on the modified non-poisoned dataset, and analyze network traffic with the machine-based model.

17 Claims, 9 Drawing Sheets

(56) References Cited

OTHER PUBLICATIONS

R. Huang, et al., "Learning With a Strong Adversary," arXiv preprint arXiv:1511.03034, 2015, Under review as a conference paper at ICLR 2016, 12 pgs.
U. Shaham, et al., "Understanding Adversarial Training: Increasing Local Stability of Neural Nets through Robust Optimization," arXiv preprint arXiv:1511.05432, 2015, Jan. 16, 2016, 12 pgs.
N. Papernot, et al., "Distillation as a Defense to Adversarial Perturbations Against Deep Neural Networks," pp. 582-597, 2016, Accepted to the 37th IEEE Symposium on Security & Privacy, IEEE 2016. San Jose, CA, Mar. 14, 2016, 16 pgs.
Metzen, et al. "On Detecting Adversarial Perturbations" arXiv preprint arXiv:1702.04267 (2017), Published as a conference paper at ICLR 2017, Feb. 21, 2017, 12 pgs.
Rouhani, et al., "CuRTAIL: ChaRacterizing and Thwarting Adversarial deep Learning." arXiv preprint arXiv:1709.02538 (2017), Dec. 22, 2017, 14 pgs.
Lin, et al., "Detecting Adversarial Attacks on Neural Network Policies with Visual Foresight." arXiv preprint arXiv:1710.00814 (2017), Oct. 2, 2017, 10 pgs.
Gu, et al., "Towards Deep Neural Network Architectures Robust to Adversarial Examples", arXiv:1412.5068 (2015), Accepted as a workshop contribution at ICLR 2015, Apr. 9, 2015, 9 pgs.
Zheng, et al., "Improving the Robustness of Deep Neural Networks via Stability Training", arXiv:1604.04326 (2016), Computer Vision Foundation, IEEE Xplore, Apr. 15, 2016, 9 pgs.
Grosse, et al., "On the (Statistical) Detection of Adversarial Examples", arXiv:1702.06280v2 [cs.CR], Oct. 17, 2017, 13 pgs.
Papernot, et al., "Practical Black-Box Attacks Against Machine Learning", arXiv:1602.02697v4 [cs.CR], Mar. 19, 2017, 14 pgs.
Chen, et al., "Automated Poisoning Attacks and Defenses in Malware Detection Systems: An Adversarial Machine Learning Approach", arXiv:1706.04146v3 [cs.CR], Preprint submitted to Computers & Security, Oct. 31, 2017, 24 pgs.
Muñoz-González, et al., "Towards Poisoning of Deep Learning Algorithms with Back-Gradient Optimization", arXiv:1708 08689v1 [cs.LG], Aug. 29, 2017, 11 pgs.
Biggio, et al., "Poisoning Attacks against Support Vector Machines", arXiv:1206.6389v3 [cs.LG], Appearing in Proceedings of the 29 th International Conference on Machine Learning, Edinburgh, Scotland, UK, 2012, Mar. 25, 2013, 8 pgs.
Demontis, et al., "Infinity-norm Support Vector Machines against Adversarial Label Contamination", In Proceedings of the First Italian Conference on Cybersecurity (ITASEC17), Venice, Italy, Jan. 2017, 10 pgs.
Biggio, et al., "Bagging Classifiers for Fighting Poisoning Attacks in Adversarial Classification Tasks", http://prag.diee.unica.it, C. Sansone, J. Kittier, and F. Roli (Eds.): MCS 2011, LNCS 6713, pp. 350-359, 2011, Springer-Verlag Berlin Heidelberg 2011, Jun. 15-17, 2011, 10 pgs.

\* cited by examiner

DETECTING DATASET POISONING ATTACKS INDEPENDENT OF A LEARNING ALGORITHM

TECHNICAL FIELD

The present disclosure relates to techniques for analyzing network traffic.

BACKGROUND

Machine learning algorithms are often re-trained on data collected during operation to adapt to changes in the underlying data distribution. For instance, network security intrusion detection systems are re-trained on a set of samples collected during network operation. Within this scenario, an attacker may poison the training data by injecting carefully designed samples to eventually compromise the whole learning process. Poisoning may thus be regarded as an adversarial contamination of the training data.

Pattern classification systems based on machine learning algorithms (e.g., support vector machines, or SVMs) are used in security-related application such as biometric authentication, network intrusion detection, and warn filtering, to discriminate between legitimate and a malicious pattern class (e.g., legitimate and spam e-mails). These applications have an intrinsic adversarial nature since the input data can be purposefully manipulated by an intelligent and adaptive adversary to undermine classifier operation.

DESCRIPTION OF EXAMPLE EMBODIMENTS

Overview

Figure 1:
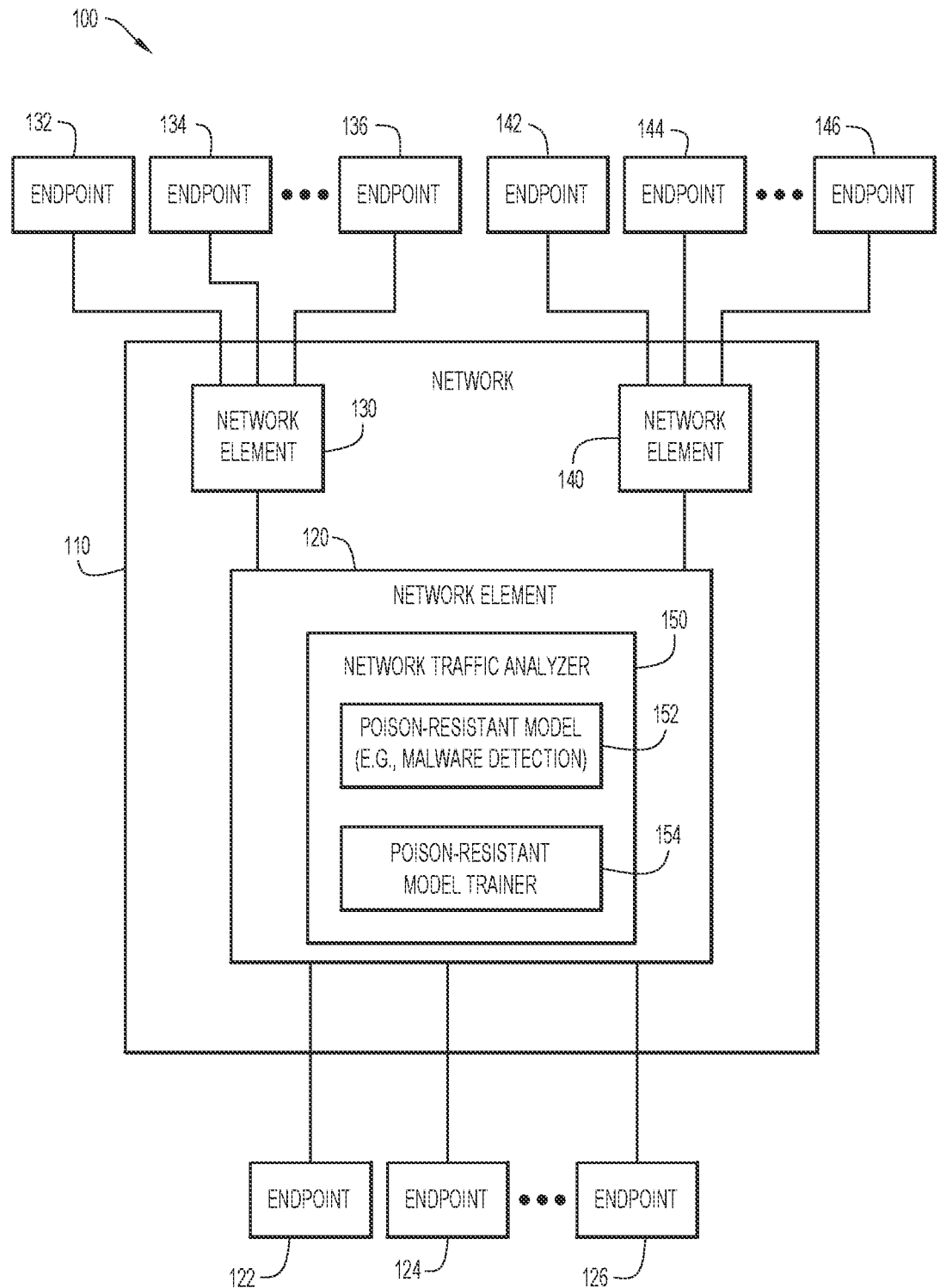
FIG. 1 is a simplified block diagram of a network environment that includes a network element that is configured to control data traffic flow based at least in part on a poison-resistant model, according to an example embodiment.

In one embodiment, a method is provided to classify a training dataset of network data as a poisoned training dataset. The method includes, at a network element in a network, classifying as training dataset of network data as a poisoned training dataset based on a first dataset-level classifier; identifying and removing poisoned samples of the poisoned training dataset based on a sample-level classifier to produce a non-poisoned dataset; training a machine-based model to analyze network traffic based on the non-poisoned dataset; and analyzing network traffic with the machine-based model of the network element.

Example Embodiments

Network traffic analytics may use curated (selected), labeled datasets for training purposes. One may generally assume that the labels are correct with a small amount of random mislabeling. In such a situation, it may be possible for an adversary to significantly alter the output of a classification algorithm with a small number of modified labels, if the mislabeled features of a sample are carefully selected. In adversarial machine learning, this attack is referred to as a poisoning attack. This type of attack may manifest itself by an adversary submitting carefully crafted malware samples for use in training a production-ready classifier.

There has been a significant amount of work related to adversarial machine learning, and specifically related to poisoning attacks. The general approach this research has taken Was to demonstrate that a machine learning algorithm is vulnerable to poisoning, and to offer algorithmic modifications to a machine learning algorithm to increase the robustness of that specific algorithm with respect to poisoning attacks. This is suboptimal for situations where multiple classes of algorithms models) are generated from a given dataset. For such situations, it would be useful to identify and filter poisoned samples from the submitted training sets.

Presented herein are techniques to detect the presence of submitted training samples meant to negatively affect the output of a machine learning classifier. These techniques involve decoupling a classifier that is used to perform production classification from a classifier that detects poisoned samples. Such separation improves performance of poisoning detection by incorporating data features that would either be inappropriate or absent in the production machine earning system.

In other words, decoupling the detection of poisoned samples from benign/malware classification permits the use of feature sets that may be inappropriate for benign/malware classification. Such features may include without limitation, contextual information, such as attributes regarding a submitting entity's submission history (e.g., number of samples, time of submission, age of account, etc.). In the case of a classifier based on network data, features about an executable or sandbox run may be used to determine if it was a poisoned sample (system calls, sandbox obfuscation strategies employed, compile time timestamps, etc.).

Identification of the presence of poisoned samples permits building of multiple machine learning solutions on top of the same dataset. Identification of the presence of poisoned samples also provides valuable threat intelligence regarding individuals/entities that initiate poisoning attacks.

Referring now to FIG. 1, a network environment 100 is shown that includes a network element configured to control data traffic across a network 110 based at least in part on a poison-resistant model.

The network environment 100 includes a network 110 that includes a plurality of network elements 120, 130 and 140, for example. Network element 120 is connected to a plurality of endpoints 122, 124, and 126, network element 130 is connected to a plurality of endpoints 132, 134, and 136, and a network element 140 is connected to a plurality of endpoints 142, 144, and 146. The specific configuration of the network 110 is by way of example only.

Network elements 120, 130 and 140 may be, without limitation, a router, a switch, firewall, gateway, intrusion detection system, and/or other physical or virtual network device or appliance that handles traffic in network 110. Network 110 may configure network elements 120, 130, and 140, as well as other network elements not pictured in a number of topologies (e.g., spine/leaf, ring, star, mesh, etc.).

Network element 120 includes a network traffic analyzer 150. Network traffic analyzer 150 includes a poison-resistant model 152 to evaluate network traffic that is received by network element 120. Network traffic analyzer 150 further includes a poison-resistant model trainer 154 to train poison-resistant model 152, including to identify and eliminate poisoned data from datasets that are used to train poison-resistant model 152. Though not explicitly depicted in FIG. 1, network element 130 and/or network element 140 may include respective network traffic analyzer functions of network traffic analyzer 150.

Poison-resistant model 152 may be trained, for example, to classify network traffic as malicious or benign. Alternatively, or additionally, poison-resistant model 152 may be trained to detect phishing attempts and/or predict quality of service (QoS). Poison-resistant model 152 is not limited to these examples.

Network element 120 may be configured to manage, control traffic (pass or drop traffic), and/or generate reports regarding network traffic based on poison-resistant model 152.

Endpoints 122, 124, 126, 132, 134, 36, 142, 144, and/or 146 may be a virtual or physical server and/or other computing device. For simplicity, three endpoints are depicted attached to each network element in FIG. 1. Other numbers of endpoints and/or additional network elements may be attached to each network element. For instance, in a data center environment, hundreds of servers may be attached to a network element.

Network element 120 may be configured as described in examples below. Network element 120 is not, however, limited to the examples below.

Figure 2:
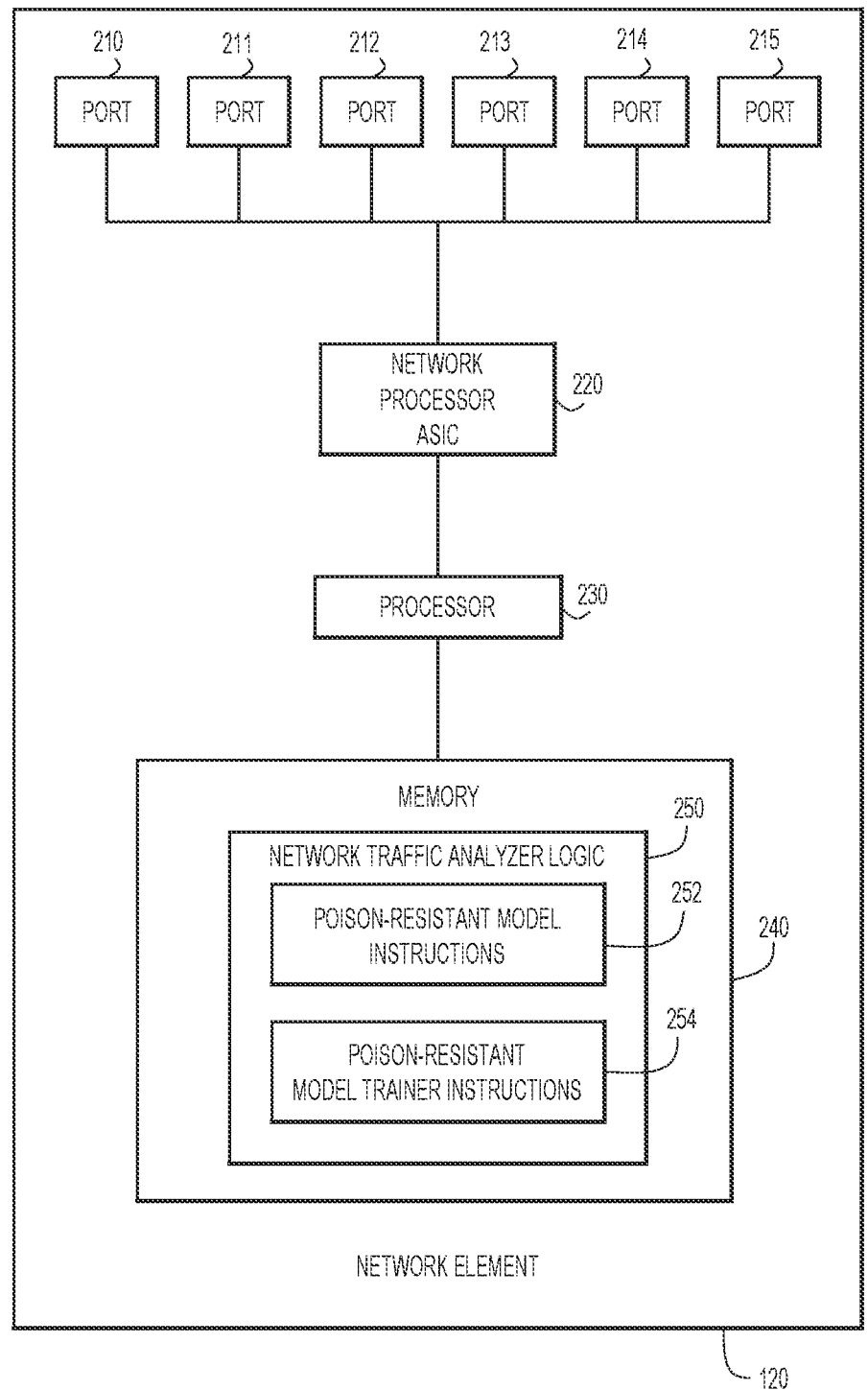
FIG. 2 is a simplified block diagram of the network element configured to participate in techniques presented herein, according to an example embodiment.

Referring now to FIG. 2, a simplified block diagram is shown of network element 120 configured to participate in techniques presented herein. In certain examples, network element 120 may be a virtual (software-based) appliance.

Network element 120 includes a network interface in the form of a plurality of network ports 210-215, a network processor Application Specific Integrated Circuit (ASIC) 220 to perform network processing functions, one or more processors 230 (e.g., microprocessors or microcontrollers), and memory 240. Network element 120 may include multiple network processor ASICs 220 to perform various network processing functions, such as routing and/or switching of network traffic received at ports 210 through 215.

Processor 230 may perform higher level control functions of network device 120, in concert with functions of network processor ASIC 220.

Memory 240 may include read only memory (ROM), random access memory (RAM), magnetic disk storage media devices, optical storage media devices, flash memory devices, electrical, optical, or other physical/tangible memory storage devices. Thus, in general, the memory 240 may include one or more tangible (non-transitory) computer readable storage media (e.g., a memory device) encoded with software that includes computer executable instructions, such that, when the software is executed by processors) 230, it is operable to perform operations described herein.

In the example of FIG. 2, memory 240 includes network traffic analyzer logic 250. Network traffic analyzer logic 250 includes poison-resistant model instructions 252 to cause processor 230 and/or network processor ASIC 220 to evaluate network traffic of network element 120. Network traffic analyzer logic 250 includes poison-resistant model instructions 252 that, when executed by the processor 230, cause the processor to perform the operations of the poison-resistant model 352 shown in FIG. 1. Similarly, network traffic analyzer logic 250 includes poison-resistant model trainer instructions 254 that, when executed by the processor 230 cause the processor to perform the operations of the poison-resistant model trainer 154 shown in FIG. 1. Thus, the poison-resistant model trainer instructions 254 cause processor 230 to train poison-resistant model instructions 252, including to identify and eliminate poisoned data from datasets that are used to train poison-resistant model instructions 252.

Poison-resistant model instructions 252 may be trained, for example, to classify network traffic as malicious or benign. Alternatively, or additionally, poison-resistant model instructions may be trained to detect phishing attempts and/or predict QoS. Poison-resistant model instructions 252 are not limited to these examples. Poison-resistant model trainer 154 and/or poison-resistant model trainer instructions 254 may be configured as described in one or more examples below.

Processor 230 and/or network processor ASIC 220 may be configured to manage, control traffic (pass or drop packets), and/or generate reports regarding network traffic based on analysis performed by poison-resistant model instructions 252.

Figure 3:
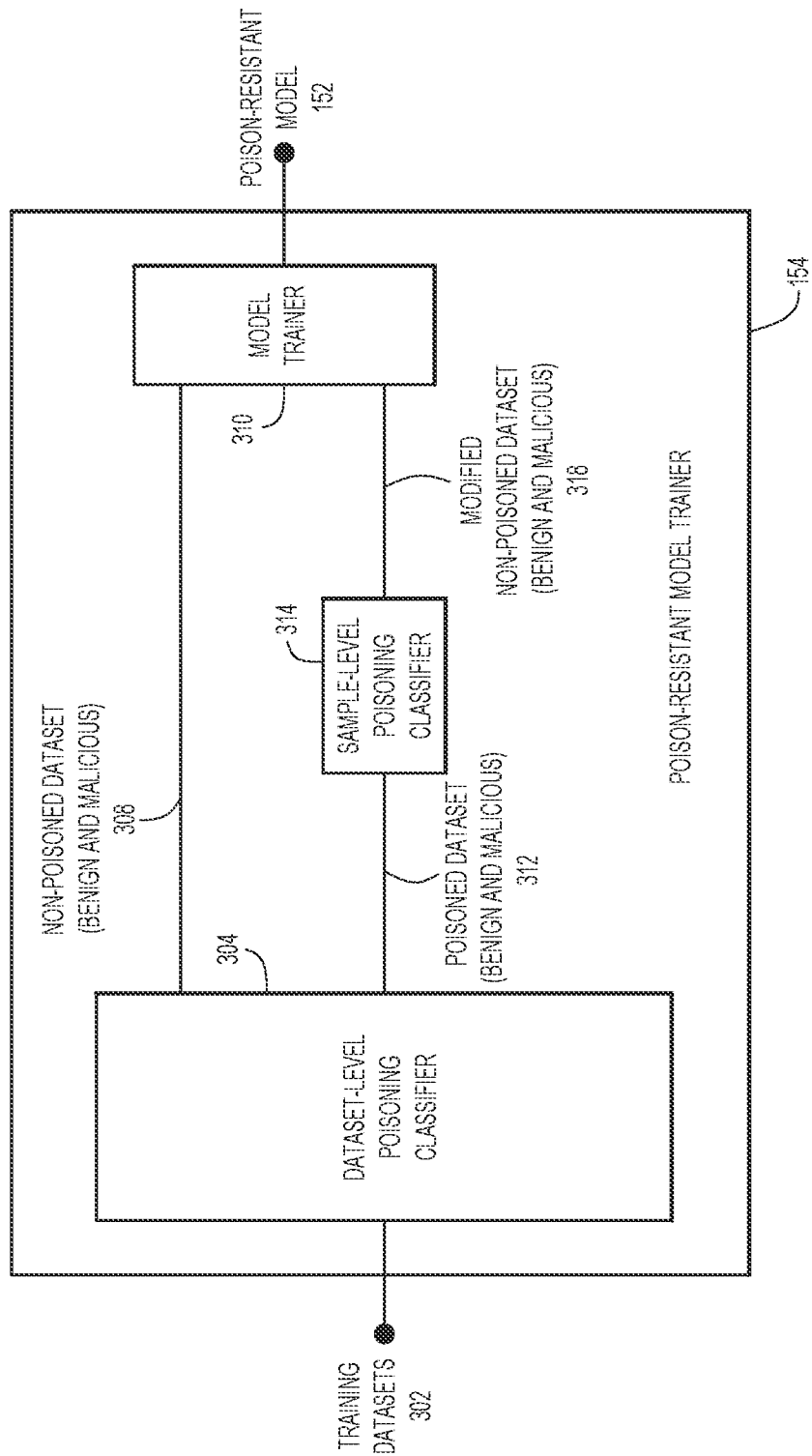
FIG. 3 is a simplified functional block diagram of a poison-resistant model trainer that is configured to train a model with a process that is resistant to adversarial poisoning of training data, according to an example embodiment.

Referring now to FIG. 3, a simplified functional block diagram is shown of poison-resistant model trainer 154 that is configured to train poison-resistant model 152 using a process that is resistant to adversarial poisoning of training data. The inputs to the poison-resistant model trainer 154 are training datasets 302.

Poison-resistant model trainer 154 includes a dataset-level poisoning classifier 304 to classify training dataset 302 as a non-poisoned dataset 308 or as a poisoned dataset 312. Training dataset 302 may include labeled data (e.g., labeled as benign or malicious). Training dataset 302 may be submitted by an individual and/or an entity/organization for training purposes.

Poison-resistant model trainer 154 further includes a sample-level poisoning classifier 314 to identify and remove poisoned samples from poisoned dataset 312, and provide a modified non-poisoned dataset 318. Poison-resistant model trainer 154 further includes a model trainer 310 to train poison-resistant model 152 from modified non-poisoned dataset(s) 318 tied, optionally, from non-poisoned dataset(s) 308.

Figure 4:
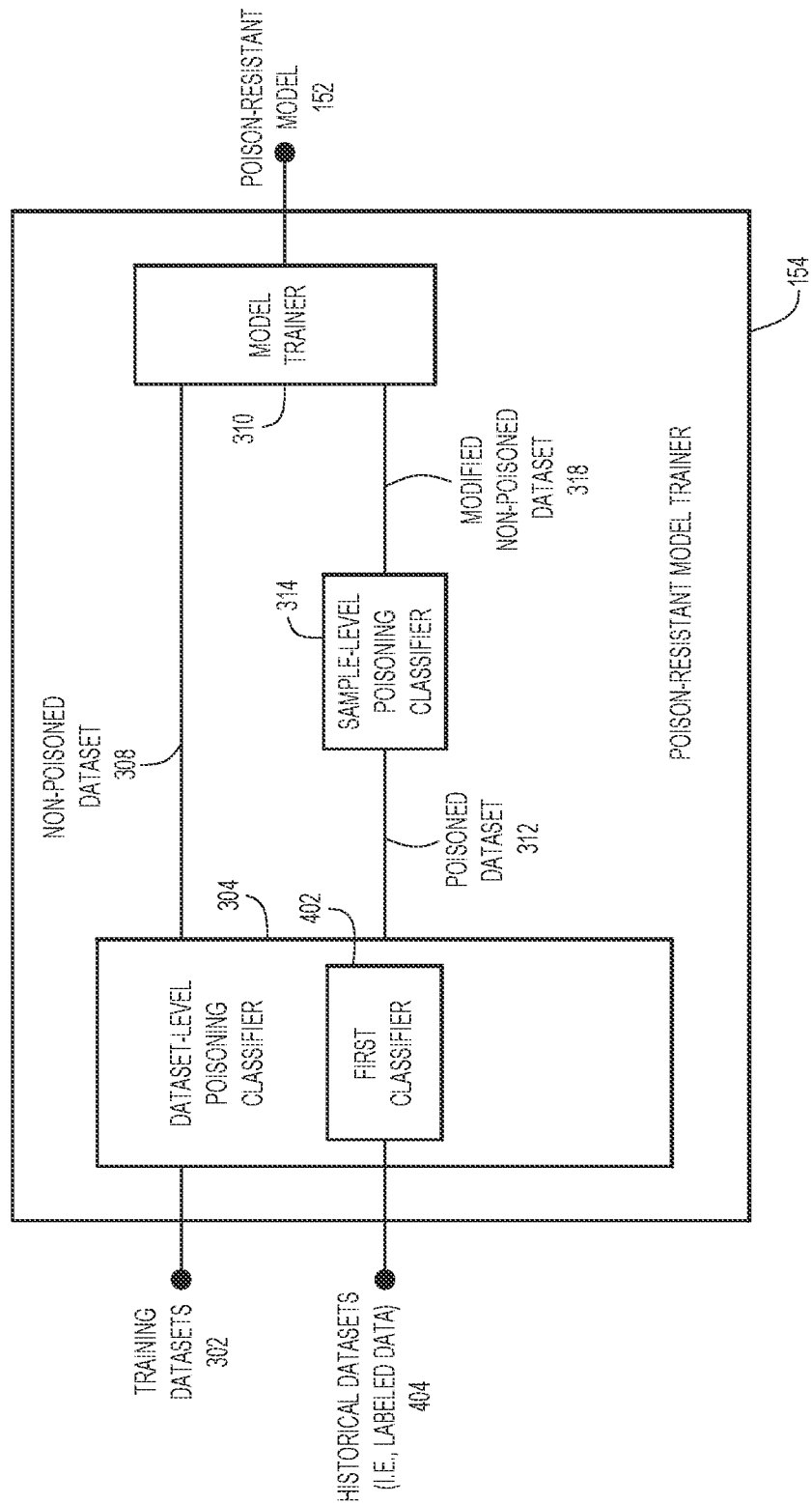
FIG. 4 is a simplified functional block diagram of the poison-resistant model trainer, according to another example embodiment.

Referring now to FIG. 4, a simplified functional block diagram is shown of another embodiment of poison-resistant model trainer 154. In this embodiment dataset-level poisoning classifier 304 is configured to train a first classifier 402 with training dataset 302, and to apply first classifier 420 to historical datasets 404 (e.g., which are labeled benign or malicious). Spikes in misclassifications (i.e., false positives and/or false negatives) may be considered indicative of poisoned data within training dataset 302. Example embodiments of first classifier 402 are described below with reference to FIGS. 5 and 6.

Figure 5:
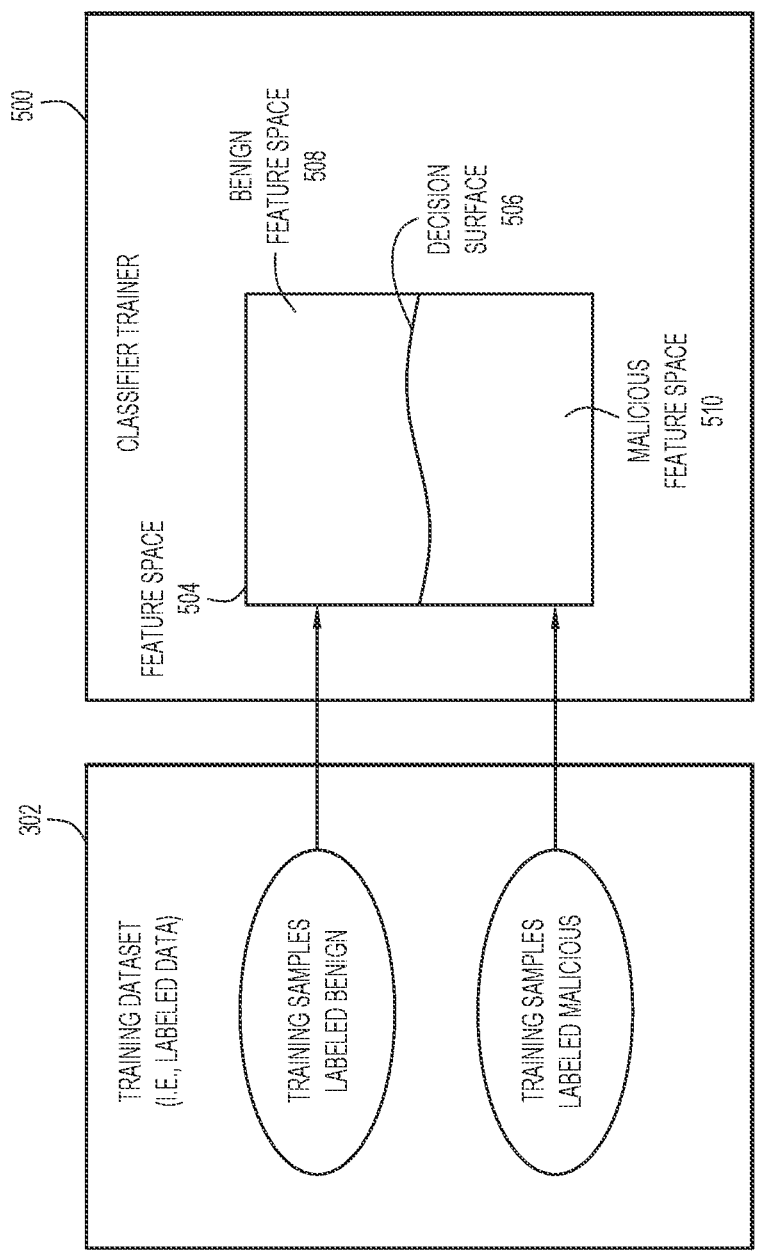
FIG. 5 is a simplified functional block diagram of a classifier trainer configured to map samples of a training dataset (e.g., labeled as benign or malicious) to a feature space based on features of the respective samples, and to learn a decision surface that distinguishes between samples that are labeled benign, and samples that are labeled malicious, according to an example embodiment.

Referring now to FIG. 5, a simplified functional block diagram is shown of a classifier trainer 500. The classifier trainer 500 is configured to map samples of training dataset 302 (e.g., labeled as benign or malicious), to a feature space 504 based on features of the respective samples. The classifier trainer 500 also is configured to learn a decision surface 506 that distinguishes between samples that are labeled benign and samples that are labeled malicious. Decision surface 506 effectively defines a benign feature space 503 and a malicious feature space 510.

Figure 6:
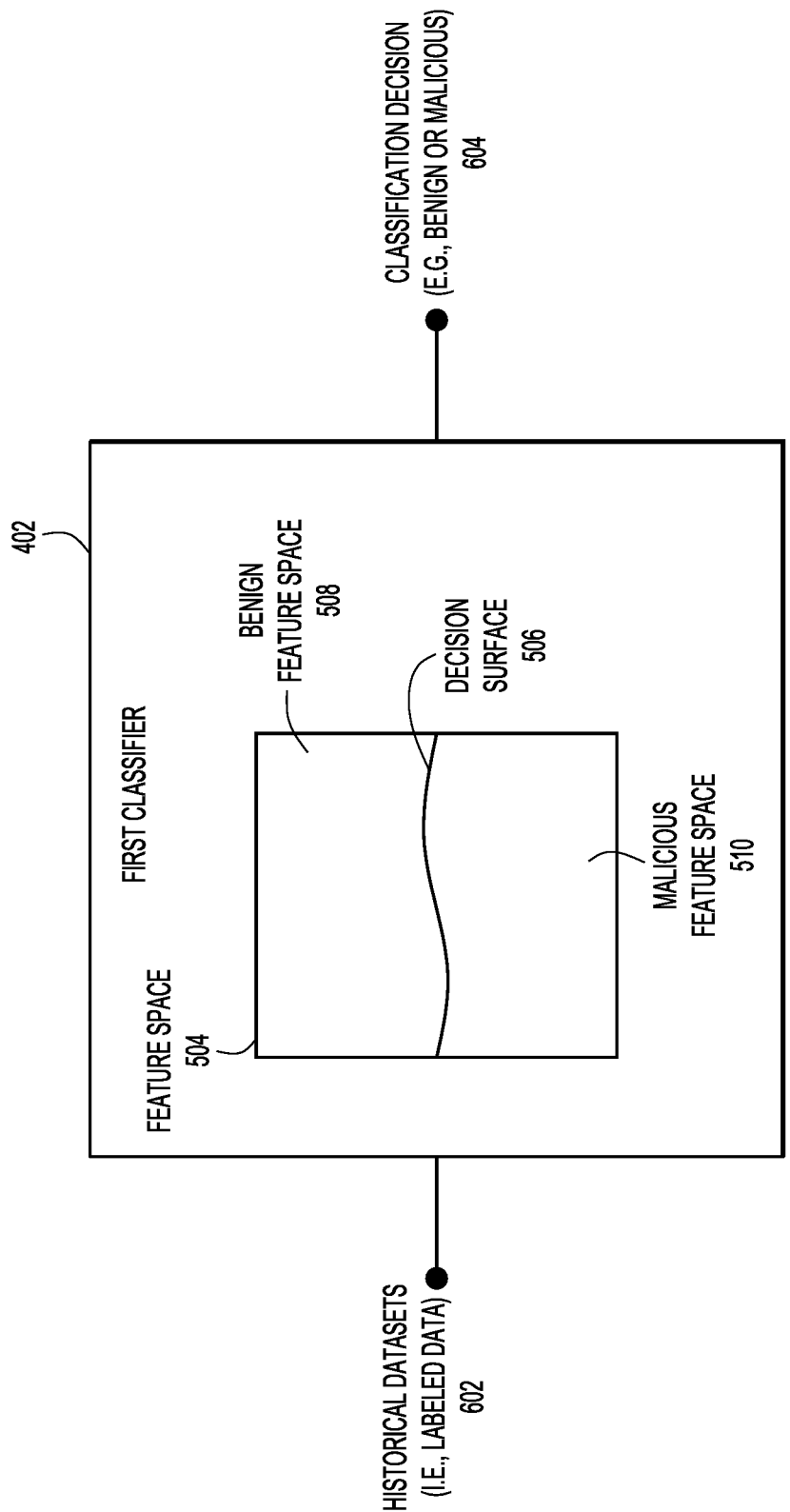
FIG. 6 is a simplified block diagram of first classifier of FIG. 4, configured to map samples of historical datasets (e.g., non-poisoned samples labeled benign or malicious), to the feature space of FIG. 5, based on features of the respective samples, and to output a classification decision for each sample (e.g., benign or malicious), depending on which side of a decision surface the unlabeled sample maps to, according to an example embodiment.

Referring now to FIG. 6, a simplified functional block diagram is shown of first classifier 402 of FIG. 4. The first classifier 402 is configured to map samples of historical datasets 602 (e.g., non-poisoned samples labeled benign or malicious), to feature space 504 based on features of the respective samples, and to output a classification decision 604 for each sample (e.g., benign or malicious), depending on which side of decision surface 506 the unlabeled sample maps to.

Classification decisions 604 may be compared to labels of the respective samples of historical datasets 602. Spikes in misclassifications indicate that decision surface 506 does not accurately represent historical datasets 602, and may be considered indicative of poisoned data within training dataset 302.

Figure 7:
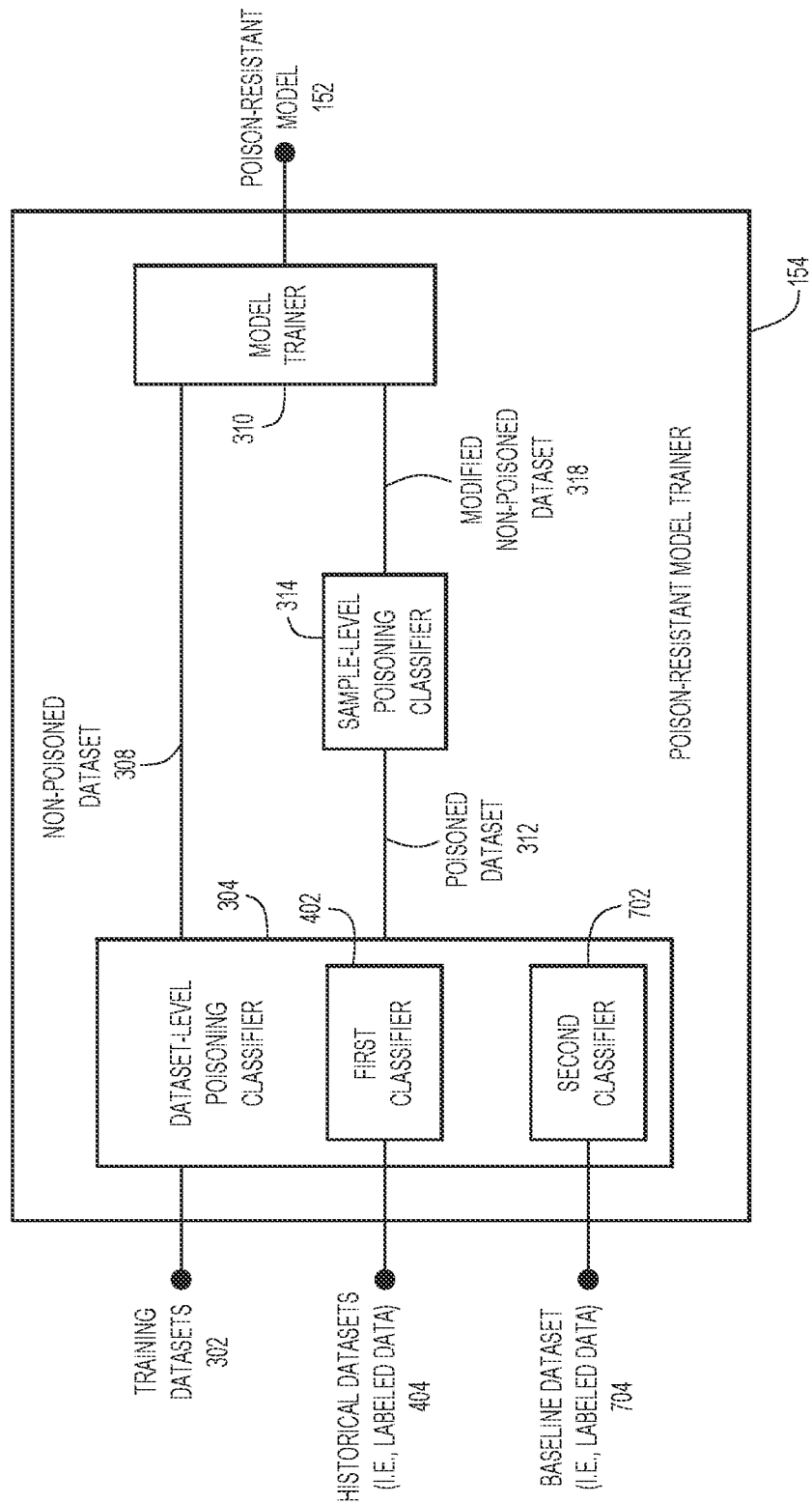
FIG. 7 is a simplified functional block diagram of a poison-resistant model trainer, according to still another example embodiment.

Referring now to FIG. 7, a simplified functional block diagram is shown of poison-resistant model trainer 154 according to still another embodiment.

In this embodiment, dataset-level poisoning classifier 304 is further configured to train first classifier 402 with historical datasets 404 and to train as a second classifier 702 with a baseline dataset 704. Baseline dataset 704 may include non-poison samples that are labeled benign or malicious. Baseline dataset 704 may be derived from historical datasets 404. Second classifier 702 may be trained to learn a decision surface for baseline dataset 704, such as described above with reference to FIG. 5.

Further in this embodiment, dataset-level poisoning classifier 304 is configured to use second classifier 702 to classify historical datasets 404, such as described above with reference to FIG. 6. The classifications of second classifier 702 may be compared to classifications 604 of first classifier 402. If the misclassifications of first and second classifiers 402 and 702 the sufficiently similar to one another (e.g., a threshold-based determination), dataset-level poisoning classifier 304 may determine that discrepancies between the misclassifications of the first and second classifiers are indicative of normal updating.

Example embodiments of sample-level poisoning classifier 314 are now described. This description is relevant to FIGS. 3, 4 and 7.

In an embodiment, sample-level poisoning classifier 314 includes prototype-based classifier, such as a support vector machine, to identify training samples that define a decision surface (e.g., a decision surface learned from poisoned dataset 312). If a subset of samples of poisoned dataset 312 significantly distort the decision surface, or if the subset of samples of poisoned dataset 312 differs significantly from a set of samples derived From baseline dataset 704 (FIG. 7), poison-resistant model trainer 354 may classify the subset of samples of poisoned dataset 312 as poisoning samples.

Alternatively, or additionally, sample-level poisoning classifier 314 is configured to compute a decision surface D from the entirety of poisoned dataset 312. For each of multiple subsets of poisoned dataset 312, sample-level poisoning classifier 314 is further configured to remove the subset from poisoned dataset 312 to produce a modified dataset, compute a decision surface D' from the modified dataset, and compute a difference in volume of decision surface D and decision surface D' ($\Delta D$), for each decision surface D'.

Sample-level poisoning classifier 314 may be further configured to perform a test to determine whether one or more of the differences $\Delta D$ is significantly larger than an average of all of the differences $\Delta D$.

The test may include, without limitation, a Neyman-Pearson test, or an application of machine learning.

Computation of the volume difference $\Delta D$ may be replaced or augmented with a similarity/dissimilarity function, such as by mapping samples of poisoned dataset 312 to an N-dimensional feature space. If a first sample s is similar to some samples with the same label (e.g., benign or malicious), with respect to some (e.g., most) features, but differs from the samples with respect to other features, sample s might be identified as a poisoned sample.

Figure 8:
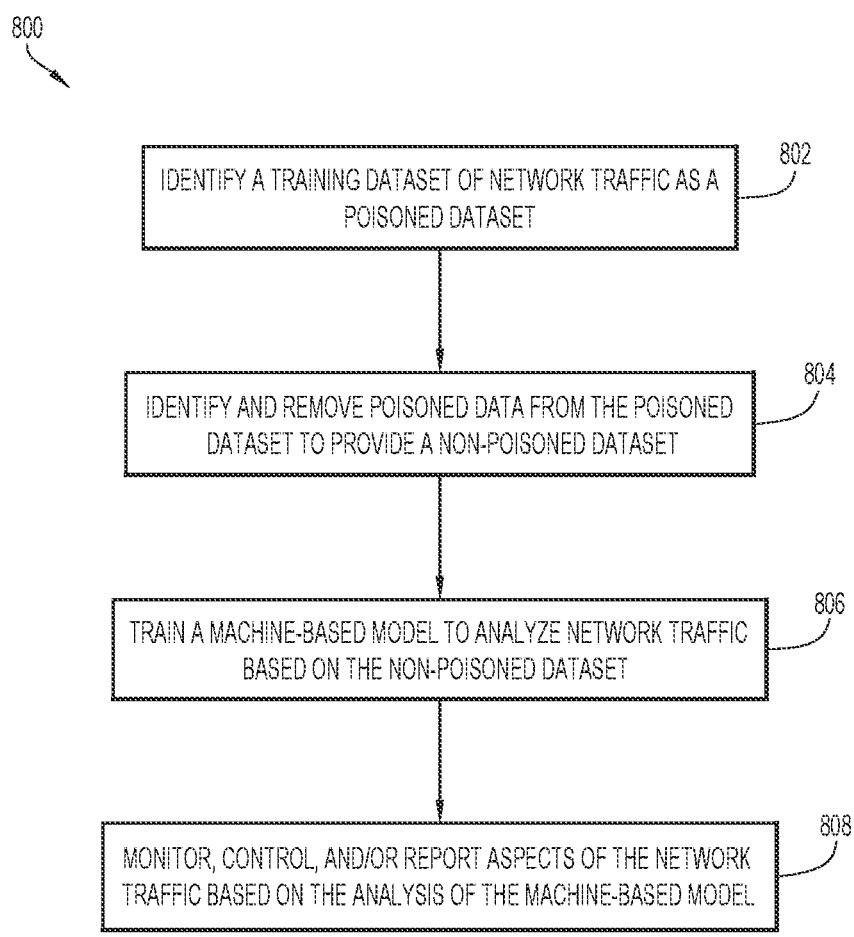
FIG. 8 is a high-level flowchart of a method of identifying a training dataset as containing poisoned data, identifying and removing poison data from the poisoned training dataset to provide a clean dataset, and training a machine-based model to analyze network traffic based on the clean dataset, according to an example embodiment.

Reference is now made to FIG. 8. FIG. 8 illustrates a high-level flowchart of a method 800. The method 800 involves identifying a training dataset (e.g., of network data), as containing poisoned data, identifying and removing poison data from the poisoned training dataset to provide a clean dataset, and training a machine-based model to analyze network traffic based on the clean dataset.

At 802, a training dataset (e.g., of network traffic), is identified as a poisoned dataset, such as described in one or more examples presented herein.

At 804, poisoned data or samples are identified within and removed from the poisoned dataset to produce a non-poisoned dataset, such as described in one or more examples presented herein.

At 806, a machine-based model is trained (e.g., to analyze network traffic), based on the non-poisoned dataset, such as described in one or more examples presented herein.

At 808, the machine-based model is used to analyze network traffic received at a network device, (e.g., to classify network traffic as benign or malicious), based on analyses of new unlabeled) data, such as described in one or more examples presented herein.

Identifying and removing poisoned data or samples from a poisoned dataset at 804 may be performed as described below with respect to FIG. 9.

Figure 9:
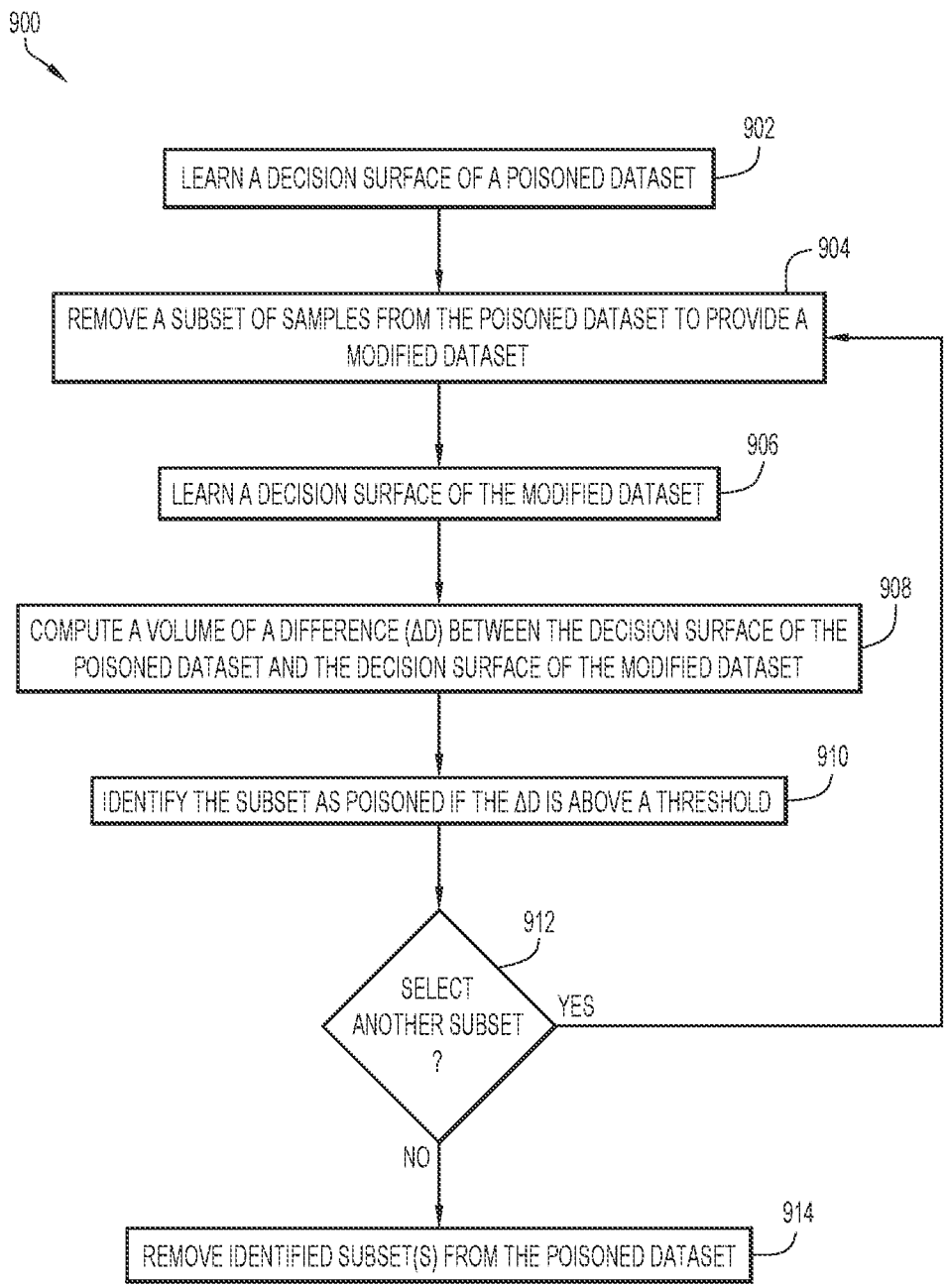
FIG. 9 is a flowchart of a method of identifying and removing poison samples from a poisoned training dataset, according to an example embodiment.

Reference is now made to FIG. 9. FIG. 9 illustrates a high-level flowchart of a method 900 of identifying and removing poison samples from a poisoned training dataset.

To understand method 900, an adversary may craft poison data points to have a noticeable influence on a decision surface of a dataset. Thus, when the poisoned data points are omitted from the dataset, the decision surface of the remaining (i.e., non-poisoned) points of the dataset is likely to differ relatively significantly from the decision surface of the poisoned dataset. Conversely, feature vectors of non-poison points tend to be relatively uniformly distributed with respect to class labels (e.g., benign or malicious). Thus, when non-poisoned points are omitted from a poisoned dataset, the decision surface of the remaining (i.e., still-poisoned) dataset may be substantially unchanged.

In view of the foregoing, at 902, a decision surface of a poisoned dataset learned, such as described in one or more examples herein.

At 904, a subset of data/samples is omitted/removed the poisoned dataset to provide a modified dataset.

At 906, a decision surface of the modified dataset is learned, such as described in one or more examples herein.

At 908, a volume of a difference ($\Delta D$) between the decision surface of the poisoned dataset and the decision surface of the modified dataset is computed. The volume of a difference ($\Delta D$) may be computed as an integral of a difference between the decision surface of the poisoned training dataset and the decision surface of the modified training dataset.

At 910, the subset is identified as poisoned if the $\Delta D$ is above a threshold (i.e., if the omitted subset contains poison points, the decision surface of the remaining (i.e., non-poison) points may differ relatively significantly from the decision surface of the poisoned dataset).

The threshold may be equal to or derived from an average $\Delta D$ of the multiple subsets.

At 912, 904 through 910 are repeated for each remaining subsets of the poisoned dataset.

At 914, subset(s) identified as poisoned at 910 are removed from the poisoned dataset to provide a modified non poisoned dataset (e.g., modified non-poisoned dataset 318 in FIGS. 3, 4, and 7).

In summary, the methods presented herein detect the presence of submitted training samples meant to negatively affect the output of a machine learning classifier. Detection of poisoned samples is decoupled from classification (e.g., benign/malware classification performed by a model trainer). In other words, the classifier that is used to perform production classification is decoupled from the classifier that detects poisoned samples. This separation allows for improving the performance of poisoning detection by incorporating data features that would either be inappropriate or absent in the production machine learning system. Thus, detection of and removal of poisoned samples by a dataset-level poisoning classifier and/or sample-level poisoning classifier may be performed with feature sets that would be inappropriate for the classification performed by the model trainer. Dataset-level poisoning class if and/or sample-level poisoning classifier may, for example, utilize features contextual features to learn a decision surface and/or to map to a feature space. Contextual features may include, without limitation, attributes about a submitting entity of a training dataset submission history, number of samples, time of submission, age of account, etc.). In the case of a classifier based on network data, features about the executable or sandbox run may be used to determine if a sample is poisoned (e.g., system calls, sandbox obfuscation strategies employed, compile time timestamps, etc.)

In one form, a method is provided that is performed at a network element, the method comprising: classifying a training dataset of network data as a poisoned training dataset based on a first dataset-level classifier; identifying and removing poisoned samples of the poisoned training dataset based on a sample-level classifier to produce a non-poisoned dataset; training a machine-based model to analyze network traffic based on the non-poisoned dataset; and analyzing network traffic received at the network element with the machine-based model.

In another form, an apparatus is provided comprising: a network interface configured to send and receive network traffic in a network; a processor coupled to the network interface and configured to: classify a training dataset of network data as a poisoned training dataset based on a dataset-level classifier; identify and remove poisoned samples of the poisoned training dataset based on a sample-level classifier to produce a non-poisoned dataset; train a machine-based model to analyze network traffic based on the non-poisoned dataset; and analyze the network traffic received at the network interface with the machine-based model.

In yet another form, anon-transitory computer readable media is provided encoded with a computer program that includes instructions to cause a processor of a network element to: classify a training dataset of network data as a poisoned training dataset based on a first dataset-level classifier; identify and removing poisoned samples of the poisoned training dataset based on a sample-level classifier to produce a non-poisoned dataset; train a machine-based model to analyze network traffic based on the non-poisoned dataset; and analyze network traffic with the machine-based model of the network element.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

What is claimed is:

1. A method performed at a network element, comprising:
    classifying a training dataset of network data as a poisoned training dataset based on a first dataset-level classifier;
    identifying and removing poisoned samples of the poisoned training dataset based on a sample-level classifier to produce a non-poisoned dataset;
    training a machine-based model to analyze network traffic based on the non-poisoned dataset; and
    analyzing network traffic received at the network element with the machine-based model,
    wherein the identifying and removing includes:
        learning a decision surface of the poisoned training dataset; and
        for each of multiple subsets of the poisoned training dataset:
        removing a given subset from the poisoned training dataset to provide a modified training dataset,
        learning a decision surface of the modified training dataset,
        computing a volume of a difference between the decision surface of the poisoned training dataset and the decision surface of the modified training dataset, and
        identifying the given subset as poisoned if the difference is above a threshold,
        wherein the threshold is an average of respective volumes of a difference between the decision surface of the poisoned training dataset and each modified training data set.

2. The method of claim 1, wherein the classifying a training dataset includes:
    training the first dataset-level classifier to distinguish between types of network data of the training dataset;

classifying a historical dataset of network data with the first dataset-level classifier; and
identifying the training dataset as poisoned based on misclassifications of the historical dataset.

3. The method of claim 1, further including:
learning contextual information related to previously-identified poison samples;
wherein the classifying a training dataset includes classifying the training dataset based in part on the contextual information related to previously-identified poison samples and contextual information related to the training dataset.

4. The method of claim 1, further including:
learning contextual information related to previously-identified poison samples;
wherein the identifying and removing poison samples includes identifying poison samples based in part on the contextual information related to previously-identified poison samples and contextual information related to the training dataset.

5. The method of claim 1, wherein the training a machine-based model includes:
training the machine-based model to classify the network traffic as benign or malicious.

6. The method of claim 1, further including:
managing the network traffic based on the analyzing, wherein the managing includes one or more of controlling the network traffic and reporting features of the network traffic.

7. An apparatus comprising:
a network interface configured to send and receive network traffic in a network;
a processor coupled to the network interface and configured to:
classify a training dataset of network data as a poisoned training dataset based on a first dataset-level classifier;
identify and remove poisoned samples of the poisoned training dataset based on a sample-level classifier to produce a non-poisoned dataset;
train a machine-based model to analyze network traffic based on the non-poisoned dataset; and
analyze network traffic received at the network interface with the machine-based model,
wherein the processor is further configured to:
learn a decision surface of the poisoned training dataset; and
for each of multiple subsets of the poisoned training dataset:
remove a given subset from the poisoned training dataset to provide a modified training dataset,
learn a decision surface of the modified training dataset,
compute a volume of a difference between the decision surface of the poisoned training dataset and the decision surface of the modified training dataset, and
identify the given subset as poisoned if the difference is above a threshold,
wherein the threshold is an average of respective volumes of a difference between the decision surface of the poisoned training dataset and each modified training data set.

8. The apparatus of claim 7, wherein the processor is further configured to:
train the first dataset-level classifier to distinguish between types of network data of the training dataset;
classify a historical dataset of network data with the first dataset-level classifier; and
identify the training dataset as poisoned based on misclassifications of the historical dataset.

9. The apparatus of claim 7, wherein the processor is further configured to:
learn contextual information related to previously-identified poison samples; and
classify the training dataset based in part on the contextual information related to previously-identified poison samples and contextual information related to the training dataset.

10. The apparatus of claim 7, wherein the processor is further configured to:
learn contextual information related to previously-identified poison samples; and
identify poison samples based in part on the contextual information related to previously-identified poison samples and contextual information related to the training dataset.

11. The apparatus of claim 7, wherein the processor is further configured to:
train the machine-based model to classify the network data as benign or malicious.

12. The apparatus of claim 7, wherein the processor is further configured to:
manage the network traffic based on the analyzing, wherein the managing includes one or more of controlling the network traffic and reporting features of the network traffic.

13. A non-transitory computer readable media encoded with a computer program that includes instructions to cause a processor of a network element to:
classify a training dataset of network data as a poisoned training dataset based on a first dataset-level classifier;
identify and removing poisoned samples of the poisoned training dataset based on a sample-level classifier to produce a non-poisoned dataset;
train a machine-based model to analyze network traffic based on the non-poisoned dataset; and
analyze network traffic with the machine-based model of the network element,
wherein the instructions further cause the processor to:
learn a decision surface of the poisoned training dataset; and
for each of multiple subsets of the poisoned training dataset:
remove a given subset from the poisoned training dataset to provide a modified training dataset,
learn a decision surface of the modified training dataset,
compute a volume of a difference between the decision surface of the poisoned training dataset and the decision surface of the modified training dataset, and
identify the given subset as poisoned if the difference is above a threshold,
wherein the threshold is an average of respective volumes of a difference between the decision surface of the poisoned training dataset and each modified training dataset.

14. The non-transitory computer readable media of claim 13, further including instructions to cause the processor to:
train the first dataset-level classifier to distinguish between types of network data of the training dataset;
classify a historical dataset of network data with the first dataset-level classifier; and identify the training dataset as poisoned based on misclassifications of the historical dataset.

15. The non-transitory computer readable media of claim 13, further including instructions to cause the processor to:
   learn contextual information related to previously-identified poison samples; and
   classify the training dataset based in part on the contextual information related to previously-identified poison samples and contextual information related to the training dataset.

16. The non-transitory computer readable media of claim 13, further including instructions to cause the processor to:
   learn contextual information related to previously-identified poison samples; and
   identify poison samples based in part on the contextual information related to previously-identified poison samples and contextual information related to the training dataset.

17. The non-transitory computer readable media of claim 13, further including instructions to cause the processor to:
   train the machine-based model to classify the network data as benign or malicious.

\* \* \* \* \*